United States Patent [19]

Hily et al.

[11] Patent Number: 4,770,515

[45] Date of Patent: Sep. 13, 1988

[54] OPTICAL VIEWING OR PROJECTION DEVICE

[75] Inventors: Claude E. Hily, Ozouer-le-Voulgis; Guy N. Martin, Noiseau, both of France

[73] Assignee: U.S. Philips Corp., New York, N.Y.

[21] Appl. No.: 923,533

[22] Filed: Oct. 27, 1986

[30] Foreign Application Priority Data

Oct. 29, 1985 [FR] France ................................ 85 16041

[51] Int. Cl.[4] ........................ G02B 27/02; G02B 27/18
[52] U.S. Cl. .................................................. 350/447
[58] Field of Search ......... 350/447, 131, 139, 514–516

[56] References Cited

FOREIGN PATENT DOCUMENTS

0141366  4/1980  Fed. Rep. of Germany ...... 350/447

*Primary Examiner*—John K. Corbin
*Assistant Examiner*—Rebecca D. Gass
*Attorney, Agent, or Firm*—William L. Botjer; Jack E. Haken

[57] ABSTRACT

Optical viewing or projection device, comprising at least two objectives ($L_1$ $L_2$) whose optical axes ($x_1$ $x'_1$; $x_2$ $x'_2$) are parallel to a general axis of symmetry ($xx'$) of the device, endowed with a focusing system permitting the formation of images or viewing in a fixed reference plane ($P'_0$), by means of simultaneous translation of the objectives in parallel to the general axis of symmetry, and comprising means for reducing the parallax produced by the objectives, the means for reducing the parallax including a system of parallel-faced plates ($M_1$ $M_2$) which has the general axis of symmetry ($xx'$) of the optical device as its axis of symmetry, wherein a parallel-faced plate is placed between each objective ($L_1$, $L_2$) and the fixed reference plane ($P'_0$) and wherein each plate is inclined to the optical axis of the objective to which it is applied at an angle determined as a function of the thickness and of the refractive index of the material of the plate, and as a function of the focal lengths and of the distance between objectives, to produce a constant transverse offset of the points in the fixed reference plane which are conjugates of the points of the general axis of symmetry of the device, whatever the position of these points on this axis, the means for reducing the parallax additionally include a system (10, 11, 12, 3, 4) permit correlation of the rotation of the parallel-faced plates with a system for focusing the objectives.

5 Claims, 9 Drawing Sheets

OPTICAL VIEWING OR PROJECTION DEVICE

TECHNICAL FIELD

The invention relates to an optical viewing or projection device comprising at least two objectives whose optical axes are parallel to a general axis of symmetry of the device, endowed with a focusing system permitting the formation of images or viewing in a fixed reference plane, by simultaneous translation of the objectives parallel to the general axis of symmetry, and comprising means for reducing the parallax produced by the objectives.

The invention finds its application in trichromatic viewing or projection systems comprising three objectives whose optical axes are parallel, these objectives being coupled with, for example, image-intensifier tubes or alternatively with viewing or projection tubes.

BACKGROUND ART

The laws of optics teach that the image of a point object which is not situated on the optical axis of a given objective is also not situated on the optical axis. Thus, when a point object moves along an axis parallel to the optical axis of the objective, the new position of the image point is deduced from that preceding by the combination of a translation in parallel to the optical axis and of a translation perpendicularly to this axis.

This leads to the fact that, when at least two objectives each form a point image of one and the same point object, and when this point object moves parallel to the optical axes of these objectives and along the general axis of symmetry of the system, the point images obtained move, on the one hand, in parallel to the optical axes and, on the other hand, perpendicularly to these axes in opposite directions.

Consequently, a single image from the images produced individually by each objective, by superposing these images, can only be obtained for points which are situated at infinity. The individual images of other points cannot be superposed which results in a fault called parallax.

It is known nowadays to reduce this parallax error by slightly inclining the optical axes of the various objectives in relation to the general axis of the system, when focusing.

However, this solution results in adjustments which are always highly sensitive and imperfect, since there remains a fault consisting of a trapezoidal distortion of the image produced by each objective, this fault producing a spatial distortion which is impossible to correct when the individual images are superposed to produce a single image.

DISCLOSURE OF THE INVENTION

The present invention furnishes a remedy for this disadvantage and provides a device such as described in the preamble and characterized in that the means for reducing parallax include a system of parallel-faced plates which has the general axis of symmetry of the optical device as its axis of symmetry, wherein a parallel-faced plate is placed between each objective and the fixed reference plane, and wherein each plate is inclined to the optical axis of the objective to which it is applied at an angle determined as a function of the thickness and of the refractive index of the material of the plate, and as a function of the focal lengths and of the distances between objectives, to produce a constant transverse offset of the points in the fixed reference plane which are conjugates of a point of the general axis of symmetry of the device, whatever the position of said point on this axis.

This device may also be characterized in that the means for reducing parallax additionally include a system permitting correlation of the rotation of the parallel-faced plates with the system for focusing the objectives.

This device may be additionally characterized in that the inclination of the plates to the optical axis of the objectives is produced by means of the rotation of the plates around a fixed axis perpendicular to a plane defined by the optical axis of the objective and the general axis of symmetry of the system, so that the planes of the plates intersect at a point of the general axis of symmetry, whose movement on this axis is related by a linear relationship to the rotation of the plates.

This device may furthermore be characterized in that the system permitting correlation of the rotation of the parallel-faced plates with the system for focusing the objectives is a mechanical device producing the translation of the movable point of intersection of the planes of the plates on the general axis of symmetry and producing, in an interdependent manner, a simultaneous and proportional translation of the objectives in parallel to this axis, the amplitude of these translations and their direction being determined to produce both the focusing in the fixed reference plane and the compensation of the parallax error by the appropriate inclination of the parallel-faced plates.

This device may also be characterized in that the translation of the objectives, in order to produce the focusing in the fixed reference plane, in the situation of aiming at infinity, is of the same magnitude as, and opposite in direction to, the translation in the situation of aiming at minimum distance, when compared with a situation of intermediate aim in correlation with the position of the movable point of intersection of the planes of the plates on the axis of symmetry, for which these plates are perpendicular to the optical axes of the objectives to which they are applied.

The device implemented in accordance with the invention permits easy and virtually perfect adjustments. Furthermore, this device is easy to manufacture and low in cost.

The invention will be understood better with the aid of the following description, illustrated by the attached figures, including:

PREFERRED EMBODIMENT FOR CARRYING OUT THE INVENTION

Figure 1A:
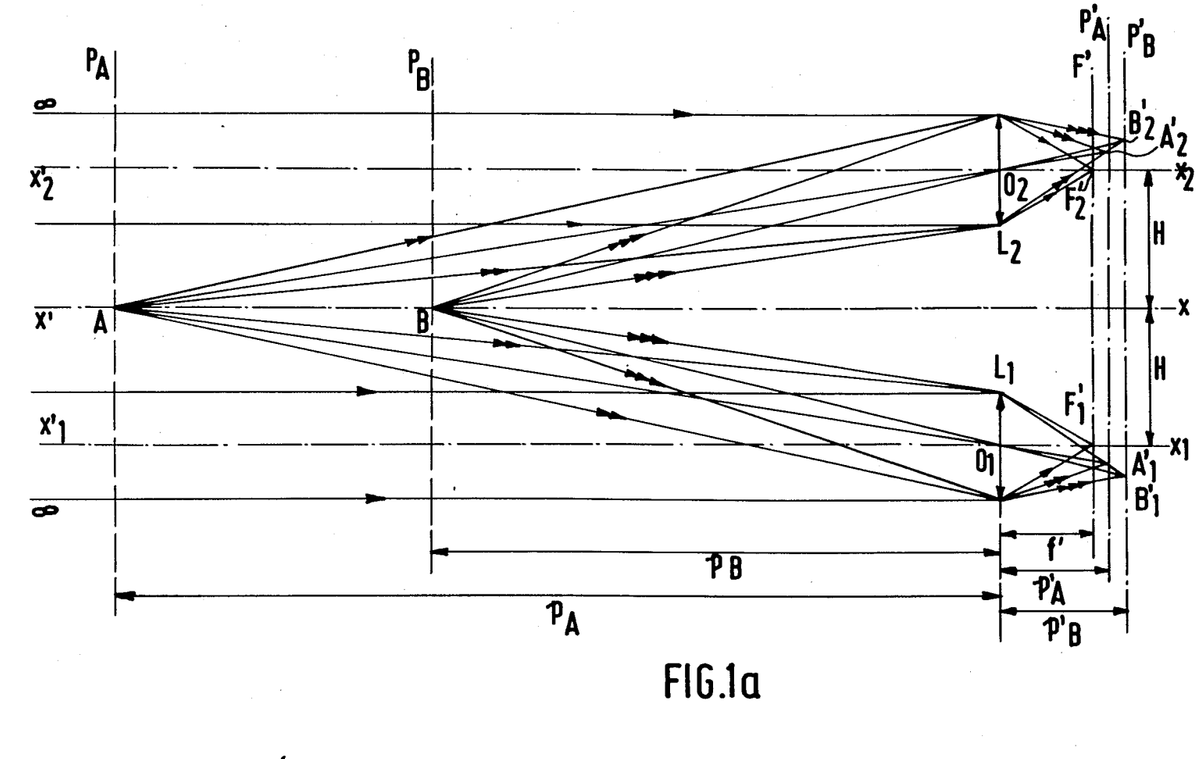
FIGS. 1a and 1b, which show the path of the light rays in a two-objective system devoid of a parallax correction device and in which the objectives are fixed, FIG. 2a, which shows the path of a ray passing through a parallel-faced plate.
Figure 1B:
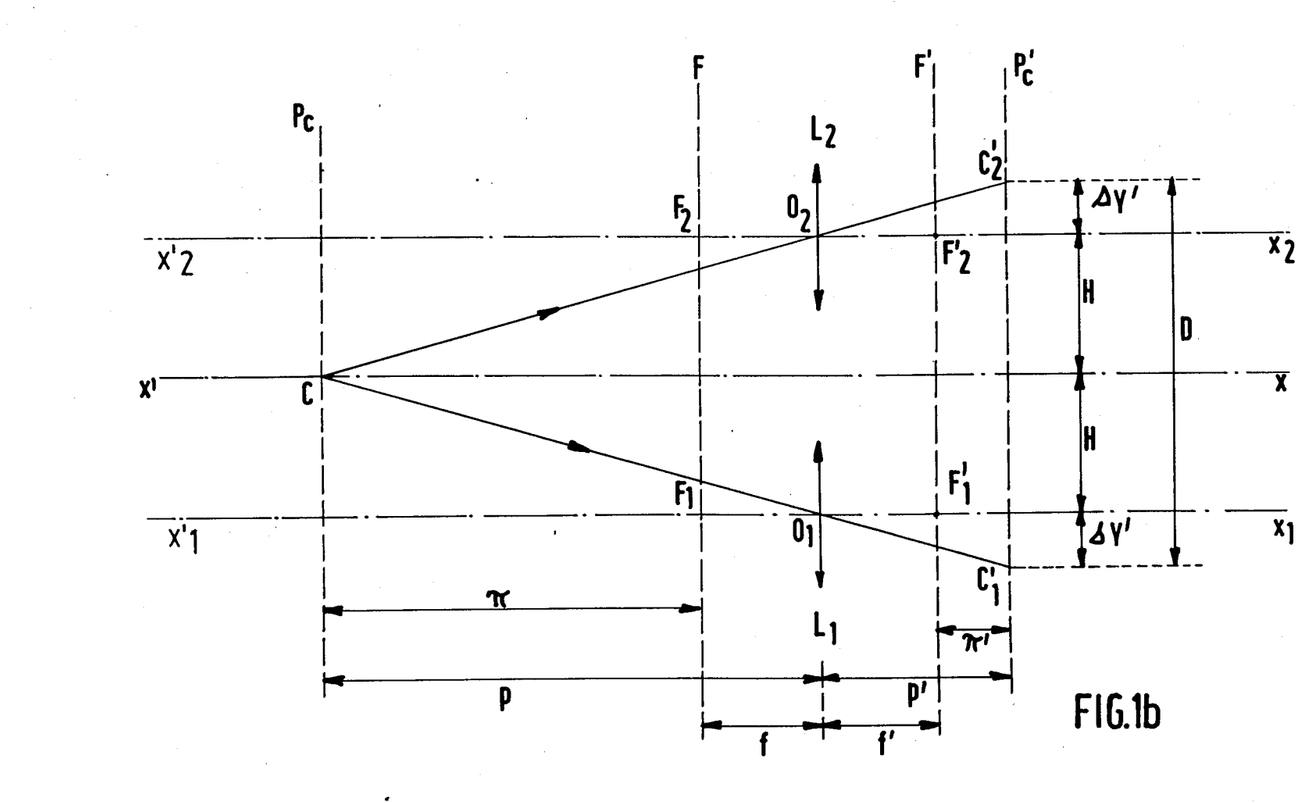

To help in the understanding of the invention, FIGS. 1a–1b show an optical system with two objectives whose optical axes are parallel, and show the path of the light beams when this system is devoid of the parallax correction device.

In the example shown in these FIGS. 1a–1b, the optical system consists of two objectives marked $L_1$ and $L_2$ which have $x'_1 x_1$ and $x'_2 x_2$ as optical axes, respectively, $0_1$ and $0_2$ as optical centres, respectively, and $F'_1 F'_2$ as image foci, respectively.

This optical system has the axis $x'x$ as a general axis of symmetry.

As shown in FIG. 1a, a point A, situated on the general axis of symmetry, $x'x$ of the system, in a plane $P_A$ placed at the distance $p_A$ from the centres of the objectives, provides, via the objective $L_1$, a conjugate point $A'_1$ situated in a plane $P'_A$ conjugate to the plane $P_A$, and provides, via the objective $L_2$, a conjugate point $A'_2$ situated in the same plane $P'_A$, these points $A'_1$ and $A'_2$ each being at a distance $H + \Delta Y'_A$ from the general axis of symmetry $x'x$.

A point B situated in a plane $P_B$ and on the general axis of symmetry $x'x$ at a distance $P_B$ which is smaller than $p_A$ from the centres of the objectives provides, via the objective $L_1$, a conjugate point $B'_1$ and, via the objective $L_2$, a conjugate point $B'_2$, these conjugate points $B'_1$ and $B'_2$ being in the plane $P'_B$ conjugate to the plane $P_B$, and at a distance $H + \Delta Y'_B$ from the general axis of symmetry $x'x$.

The conjugate plane $P'_B$ is thus further away from the optical centres than the conjugate plane $P'_A$, and the value of $\Delta Y'_B$ is greater than that of $\Delta Y'_A$, the quantities $\Delta Y'_A$ and $\Delta Y'_B$ being called transverse offsets.

Lastly, the objectives $L_1$ and $L_2$ provide, for a plane situated at infinity, conjugate points situated at the image foci $F'_1$ and $F'_2$ of these objectives, these foci being situated at the distance f' from the entre of the objectives and at a distance H from the general axis of symmetry $x'x$.

It may be clearly seen, therefore, that, according to the distance which separates a point on the general axis of symmetry from the objectives, the conjugates are situated in planes placed at different distances from the objectives and that, furthermore, these conjugate points are situated at different distances from the general axis of symmetry $x'x$.

To enable a system of this kind to be used for viewing or alternatively for projection, it is necessary first of all, that the conjugate points obtained from planes situated at any distances from the objectives are formed in one and the same plane, that is to say that all the points of the general axis of symmetry $x'x$ may be imaged in one and the same fixed reference plane, which will then be the viewing or projection plane.

This is readily obtained by means of a process which is known to the person skilled in the art, consisting in the simultaneous translation of the objectives in parallel to the axis of symmetry, by means of a rotatable focusing ring which permits focusing by means of a helical movement.

The fixed reference plane will be denoted by $P'_0$ in the following description.

Furthermore, in order to enable a system of this kind to reconstruct a single image from two or three images produced individually by means of two or three objectives whose optical axes are parallel and which have a general axis of symmetry such as $x'x$, it must be possible for the different values of transverse offset to be normalized to a fixed reference value, for example $\Delta Y'_0$, whatever the distance between the conjugates of the fixed plane $P'_0$ and the objectives.

In systems prior to the invention, as has already been stated, compensation of parallax error, or compensation for the variations in the transverse offset, was obtained by a tilt of the objectives whose optical axes were then no longer parallel to the general axis of symmetry of the system. This produced a trapezoidal fault in the image produced by each objective, and when, for example, monochromatic images were recombined to produce a polychromatic image, the different trapezoidal faults would combine in opposite directions so that the polychromatic recombination image was distorted in space.

It was therefore impossible to get rid of the parallax fault without being subject to another fault.

The present invention, on the other hand, makes it possible to produce a perfect image, since the proposed device makes it possible to get rid of the parallax error without introducing another fault, especially distortion.

The device according to the present invention makes it possible, in fact, to adjust the transverse offset of the image points to a constant reference value $\Delta Y'_0$, whatever the position of the conjugate of the fixed reference plane $P'_0$ relative to the objectives. This result is obtained by means of parallel-faced plates of thickness e and refractive index n, which are inclined at an angle $\alpha$ to the optical axes of the objectives, these axes remaining parallel to the general axis of symmetry of the system and these plates being placed between the objectives and the fixed reference plane $P'_0$.

It is self-evident that the viewing or projection objectives will be corrected for the aberrations due to the insertion of parallel-faced plates of refractive index n and thickness e which are placed in convergent beams. Such aberration corrections, when objectives are produced, are commonplace to the person skilled in the art, who nowadays uses computer-assisted calculation programs for this purpose.

The calculations which follow will show how to determine the thickness e of the plates, their refractive index n and the inclination angle $\alpha$, to produce the parallax correction as a function of the initial data for the system shown in FIG. 1b, which are:

the distance p between the plane $P_c$ which contains a point C of the axis of symmetry $x'x$ of the system and the plane which contains the centres of the objectives;

the distance p' between the plane of the centre of the objectives and the plane $P'_c$ which contains the conjugate points of point C;

the focal length f' of the objectives, which will be called the image focal length, and the focal length f, which will be called the object focal length if point C is considered to be the object, p the object distance, the plane $P'_c$ the image plane and p' the image distance. It is obvious that, owing to the principle of inverse propagation of light, the conclusions to which the following calculations will lead would be just as valid if the points C' were defined as objects and the points C as images.

Under these assumptions, the image-object conjugation for the system shown in FIG. 1b are based on the relationship (1)

$$-1/p + 1/p' = 1/f \tag{1}$$

in which relationship it can be written that (relationship 2):

$$1/p = 1/(f + \Delta x') \tag{2}$$

The expression $\Delta x'$ represents the defocusing term due to lack of focusing in relation to the conditions under which the object C is at infinity, and its images are in the image focal plane F' of the objectives. The distance $\Delta x'$ is thus the magnitude of the translation which must be applied to the optical centres $0_1$ and $0_2$ of the objectives $L_1$ and $L_2$, in parallel to the general axis of symmetry x'x of the system, in order to make the image plane $P'_c$ coincide with the image focal plane F' defined previously, when the position of the object point C is varied along the general axis of symmetry x'x.

Thus, by means of this operation it is possible to maintain the image plane $P'_c$ (or, with inverse propagation the viewing plane) in a fixed position defined previously as $P'_0$, and which corresponds to the conditions of aiming at infinity.

Now, for an optical objective, the value of the factor $\Delta x'$ is determined as a function of the pitch 2 of the helix with which the objective is rotated by its focusing ring in its mounting, to perform the focusing by translation along its optical axis, and as a function of the angle $\Delta \theta$ which is the angle of rotation of this focusing ring measured from the position of focusing for infinity. This is expressed by the relationship (3):

$$x' = l \cdot \Delta \theta / 360 \tag{3}$$

in which $\Delta \theta$ is expressed in degrees.

Relationship (4) can then be derived from relationship (2) by replacing $\Delta x'$ by the value of the relationship (3):

$$-p = f^2 \cdot (l \times \Delta \theta / 360)^{-1} + f \tag{4}$$

The magnification G between the image and the object may then be written simply, with the aid of relationship (4), according to the relationship (5):

$$G = p'/p \tag{5}$$

$$G = (+1/f)(l \cdot \Delta \theta / 360)$$

or else $$G = (+1/f) \Delta x' \tag{6}$$

With this established, FIG. 1b shows furthermore that the objectives $L_1$ and $L_2$ provide two image points $C'_1$ and $C'_2$, respectively, of a point C on the general axis of symmetry. The distance between $C'_1$ and the optical axis $x'_1 x_1$ of $L_1$, or alternatively the distance between $C'_2$ and the optical axis $x'_2 x_2$ of $L_2$ is the transverse deviation $\Delta Y'$. This transverse deviation $\Delta Y'$ is a function both of the focusing, as has already been shown and illustrated by means of Figure 1a, and of the distance 2H separating the centres $0_1$ and $0_2$ of the objectives. One can therefore write that:

$$\Delta Y'/H = p'/|p|$$

or alternatively that:

$$\Delta Y' = +H \cdot |G| \tag{7}$$

which, with the aid of the relationship (5), makes it possible to write:

$$\Delta Y' = (H/f)(l \cdot \Delta \theta / 360) \tag{8}$$

or alternatively:

$$Y' = (H/f) \Delta x' \tag{9}$$

The distance D separating the two images $C'_1$ and $C'_2$ from each other can also be defined.

$$D = 2(H + \Delta Y')$$

The distance D may be expressed either as a function of the relationship (8)

$$D = 2H + 2(H/f)(l \cdot \Delta \theta / 360) \tag{10}$$

or alternatively as a function of the relationship (9)

$$D = 2H + 2(H/f) \Delta x' \tag{11}$$

This set of relationships establishes that it is permissible to relate the distance D (or the transverse deviation $\Delta Y'$) to the focusing parameters of the objectives which are l and $\Delta \theta$, or to the value of the defocusing term $\Delta x'$.

Figure 3A:
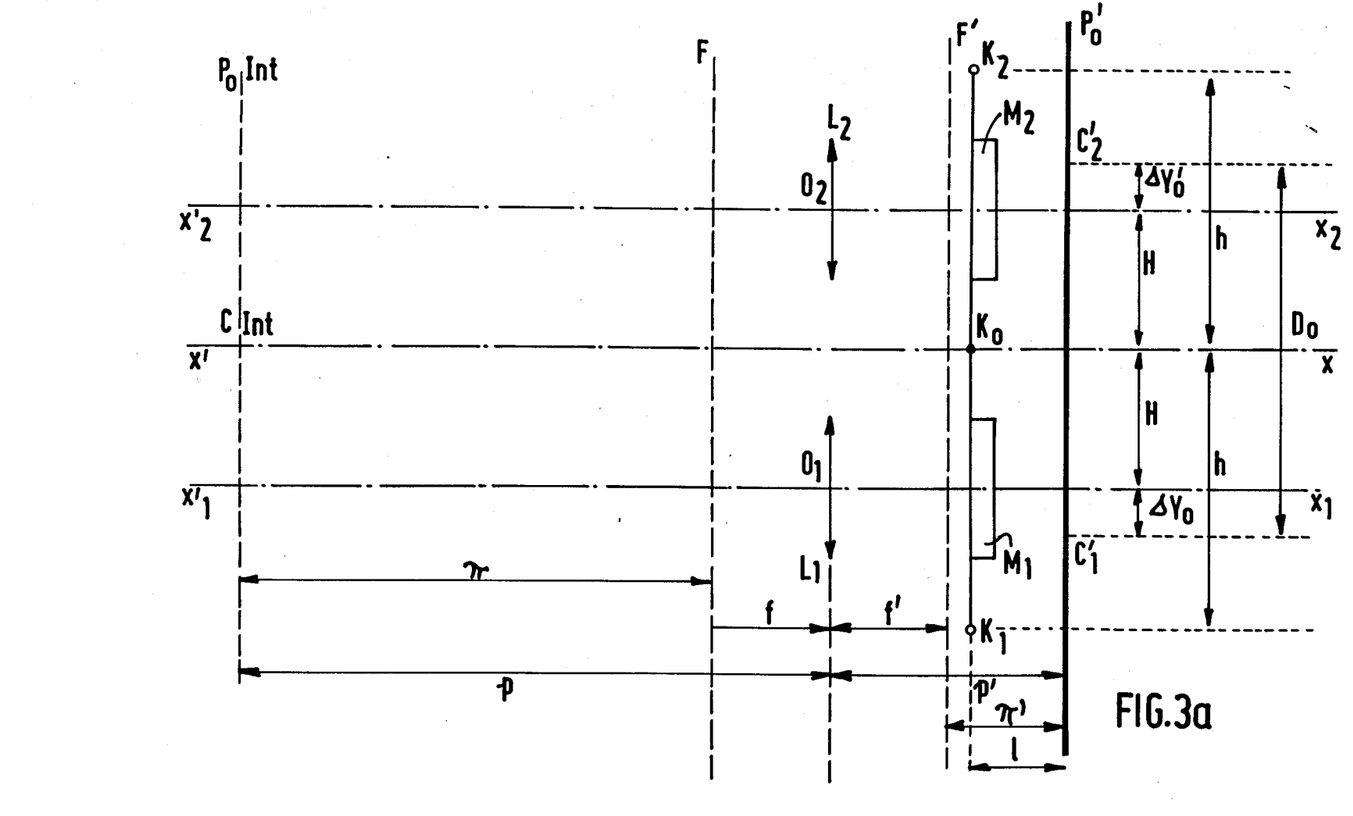
Figure 3B:
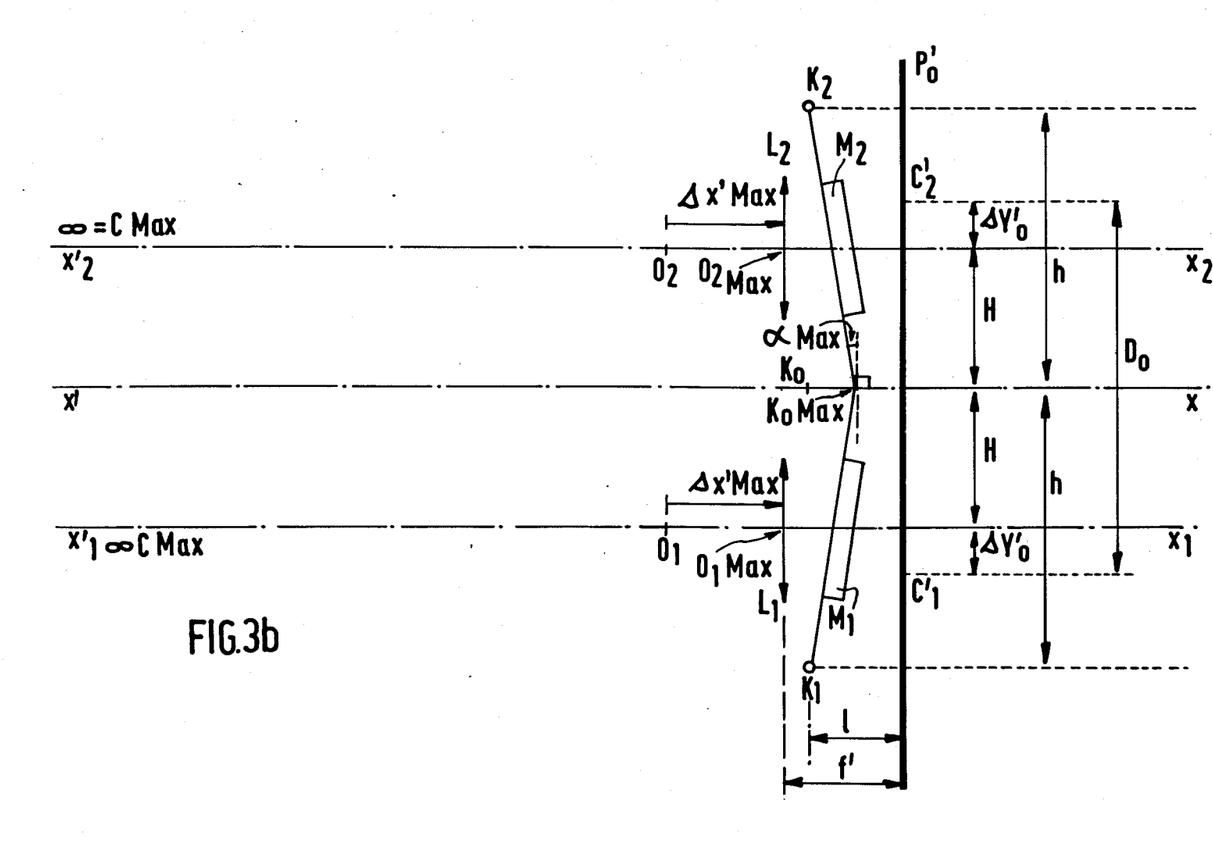

According to the invention, and as shown in the set of FIGS. 3a-3b, parallel-faced plates are inserted between the objectives and the fixed reference plane $P'_0$ in order to reduce the transverse deviation $\Delta Y'$ and to give it a fixed value $\Delta Y'_0$.

The plate applied to the objective $L_1$ is marked $M_1$ and the plate applied to the objective $L_2$ is marked $M_2$. The plates have a thickness e and a refractive index n, and are inclined to the optical axes by an angle $\alpha$ situated in the plane defined by each optical axis and the general axis of symmetry x'x, so that their placing is symmetrical in relation to this axis of symmetry. The plane of each plate is thus perpendicular to the plane defined by the optical axis of the objective to which it is applied and the general axis of symmetry of the system. This is particularly important in the case where the system comprises more than two objectives placed so as to have a general axis of symmetry.

Figure 2A:
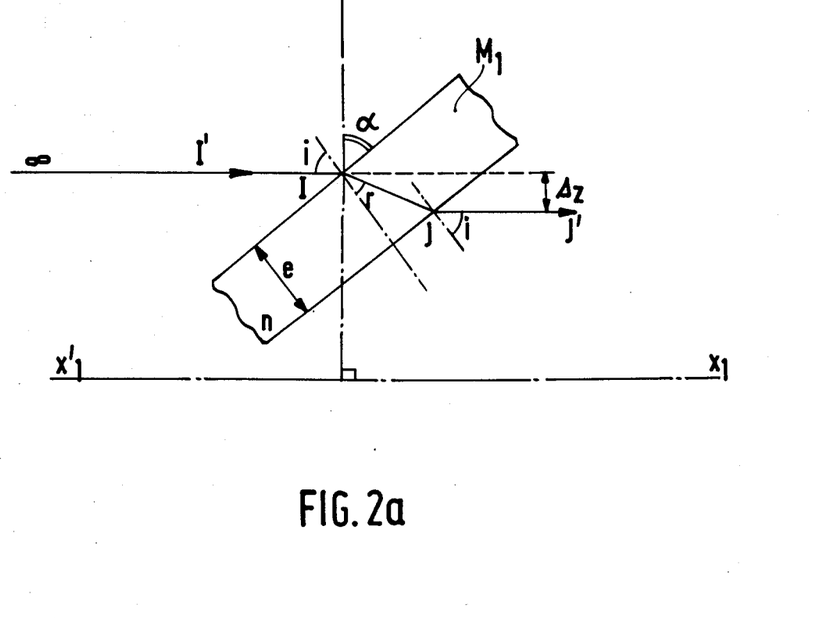

FIG. 2a shows the path of a ray I'I parallel to the optical axis of an objective and passing through a parallel-faced plate of this kind, for example $M_1$.

The angle of incidence of ray I'I on the plate is i, the angle of the ray Ij refracted in the plate is r, and since the exit medium is in this case identical to the entry medium, for example air, the angle of the exit ray JJ' is i.

The laws of optics show that, since the entry ray I'I and the exit ray JJ' are parallel, the offset $\Delta z$ between the entry ray and the exit ray, or the geometrical distance between these rays can be written according to the relationship (12)

$$\Delta z = e \sin i [1 - (1 - \sin^2 i)^{\frac{1}{2}} (n^2 - \sin^2 i)^{-\frac{1}{2}}] \tag{12}$$

Since the angle of incidence i of the rays on the plate is related to the angle of inclination of the plate to the optical axis of the objective, this relationship (12) shows that, by appropriately choosing the values of the thickness e and of the refractive index n of the plates and the angle of incidence i, it is possible to find an angle $\alpha$ of inclination of the plate to the optical axis of the objective, such that the deviation $\Delta z$ compensates the change in the deviation $\Delta Y'$ when the position of the object in front of the objective changes. And, since it has been shown that the deviation $\Delta Y'$ could also be related to the defocusing term $\Delta x'$, then it is possible, using the above relationships, to determine at the same time the parameters e, n and $\Delta Y'$ (or D) in order that the term $\Delta x'$ should be related to the angle $\alpha$ by a linear relationship.

In establishing this linear relationship, however, account must be taken of the fact that the insertion of a parallel-faced plate between the objective and the image produces a deviation of the optical centres by a value $e(n-1)n^{-1}$. This value will be added to or subtracted from the value of the deviation $\Delta x'$ depending on the direction of the latter, but also depending on the direction of tilting of the parallel-faced plate. This value will therefore appear as a constant in the system according to the invention.

Figure 2B:
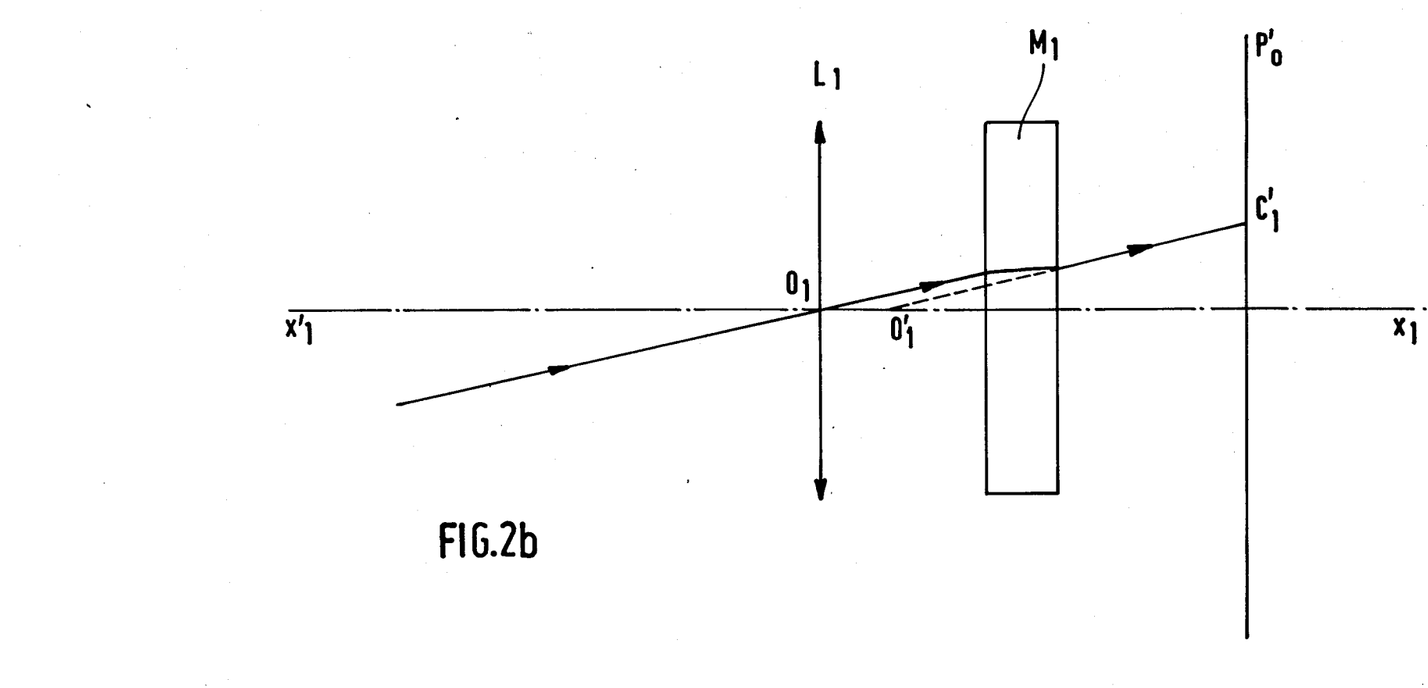
FIG. 2b, which shows the offset produced by a parallel-faced plate in the position of the optical centre of an objective to which it is applied, FIGS. 3a, 3b and 3c which show a two-objective system equipped with a parallax correction device according to the invention and adjusted for aiming at different distances respectively, FIG. 4, which shows an example of an embodiment of the device according to the invention.

FIG. 2b shows that, for example, the centre of the objective $L_1$, actually placed in the position $0_1$ is seen through the plate as being in the position $0'_1$, such that the distance $0'_1 0_1 = e(n-1)n^{-1}$.

The device according to the invention permits therefore, to obtain an offset $\Delta z$ such that it compensates the variations in the transverse offset $\Delta y'$ in order that the latter may retain a desired constant value $\Delta Y'_0$, whatever the position of the object plane. In addition, this device makes it possible to maintain the optical system in the conditions of aiming at infinity, that is to say of choosing the deviation $\Delta x'$ corrected by the term $e(n-1)n^{-1}$, such that the plane on which the images are formed, whatever the position of the object plane, may be the fixed plane $P'_0$, which coincides with the image focal plane under the condition where the object is at infinity.

Figure 3C:
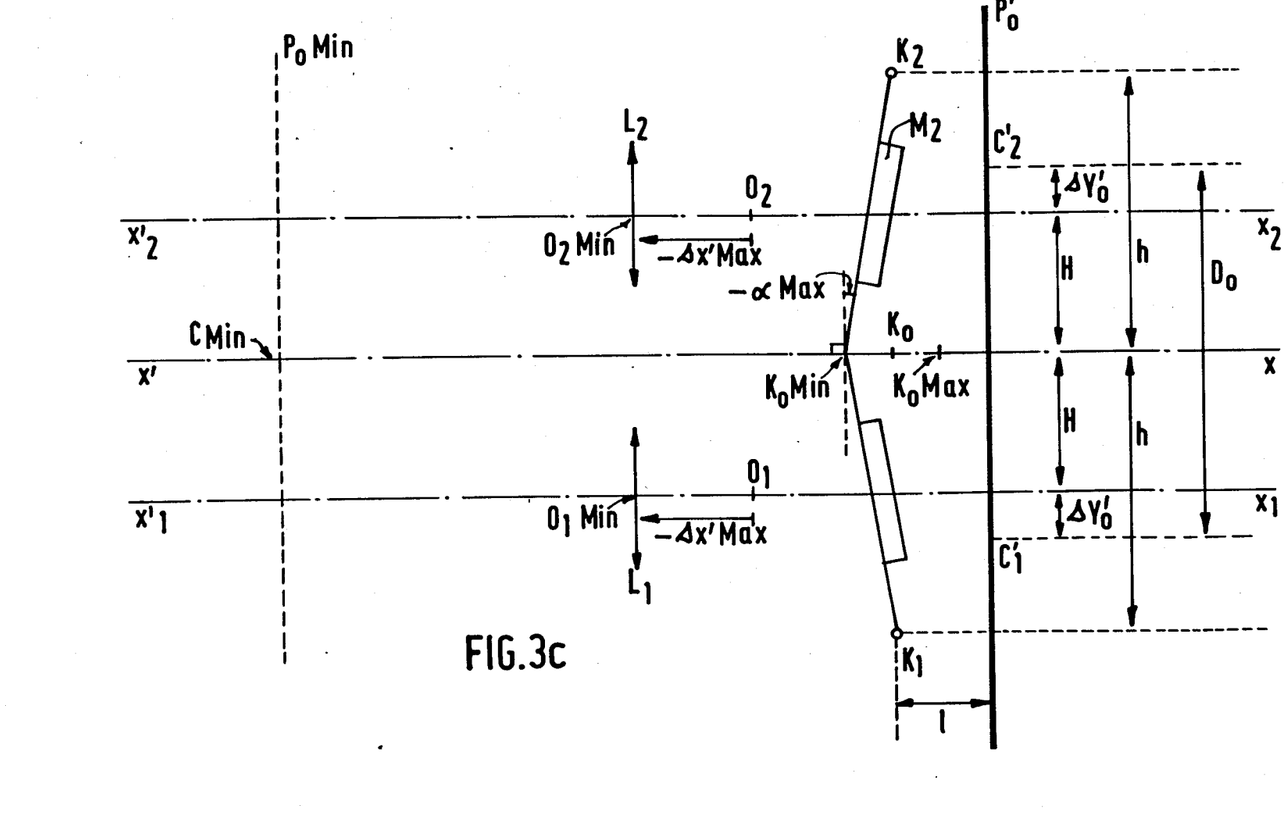

In a particular and advantageous embodiment of the invention, the parameters of the components of the device have been determined so that, for each plate associated with an objective, the angle $\alpha$ is of the same value and of opposite sign for the condition where the object is at infinity, and for the condition where the object is in position $C_{min}$ as close as possible to the objective, as shown in FIGS. 3b and 3c, respectively. In this embodiment furthermore angle $\alpha$ assumes the value 0, that is to say that the plates $M_1$ and $M_2$ are perpendicular to the optical axes, for an intermediate position $C_{int}$ of the object, as shown in FIG. 3a.

Thus, as shown in FIG. 3a, the device according to the invention consists of two objectives $L_1$ and $L_2$ with parallel optical axes $x'_1 x_1$ and $x'_2 x_2$, respectively, having $x'x$ as the general axis of symmetry. The centre of these objectives is in a position $0_1$ and $0_2$ such that, for an object placed in position $C_{int}$ on the axis $x'x$, the image plane consists of the plane $P'_0$ defined earlier, and the parallel-faced plates $M_1$ and $M_2$ are perpendicular to the optical axes $x'_1 x_1$ and $x'_2 x_2$, respectively.

In this embodiment, the parallel-faced plates $M_1$ and $M_2$ can rotate around an axis whose projection on the plane defined by the optical axis which relates to them and by the general axis of symmetry (the plane of FIGS. 3, in this case) is the point $K_1$ in the case of $M_1$, and the point $K_2$ in the case of $M_2$. These points $K_1$ or $K_2$ are at a distance of magnitude h from the general axis of symmetry.

In the case of FIG. 3a, where the parallelfaced plates are perpendicular to the optical axes, the angle $\alpha$ of inclination of the plates to the optical axis is zero:

$$\alpha = 0$$

and the support-plane of the plates intersects the general axis of symmetry of the system at point $K_0$.

The images of the point $C_{int}$ which are formed by the objectives-plates system are the points $C'_1$ and $C'_2$ in the plane $P'_0$. These image points $C'_1$ and $C'_2$ are at a distance of the reference value $\Delta Y'_0$ from the optical axes $x'_1 x_1$ and $x'_2 x_2$, respectively. In addition, the image points $C'_1$ and $C'_2$ are separated from each other by a distance of the value:

$$D_0 = 2H + 2\Delta Y_0$$

In the configurations of FIG. 3b, the device is adjusted to form the image of an object at infinity in the reference plane $P'_0$.

To this end, the optical centres of the objectives have been brought into position $0_1$Max and $0_2$Max by a translation of value $\Delta x'$Max, so that the optical path between the optical centres $0_1$Max and $0_2$Max and the plane $P'_0$ is equal to the image focal length f' of the objectives.

The images of a point at infinity are then the points $C'_1$ and $C'_2$ in the fixed plante $P'_0$. The parallel-faced plates $M_1$ and $M_2$ are inclined by an angle $\alpha$Max such that these images $C'_1$ and $C'_2$ are at a distance of the reference value $\Delta Y'_0$ from the optical axes $x'_1 x_1$ and $x'_2 x_2$, and at a distance from each other which has the value:

$$D_0 = 2H + 2\Delta Y_0$$

Since the plates have undergone a rotation through an angle $\alpha$Max around the fixed axes $K_1$ and $K_2$, the support-plane of the plates intersects the general axis of symmetry $x'x$ at point $K_0$Max.

To the displacement $\Delta x'$Max of the centres of the objectives there thus corresponds an angle of rotation $\alpha$Max of the plates which is produced by the movement from $K_0$ to $K_0$Max of the point of insertion of the support-plate of the plates with the axis of symmetry $x'x$.

In the configurations of FIG. 3c, the device according to the invention is adjusted to form in the reference plane $P'_0$ the image of a point in position C Min, which is the closest position permitted by the objectives.

To this end, the optical centres of the objectives have been brought into position $0_1$ Min and $0_2$ Min by a movement of value $-\Delta x'$Max, so that the optical path between the centres $0_1$ Min and $0_2$ Min and the fixed plane $P'_0$ is equal to the image distance between $P'$ which is the conjugate of the object distance p.

To this movement $-\Delta x'$Max of the centres of the objectives there corresponds an angle of rotation of the same absolute value $|\alpha\text{Max}|$ but of opposite sign in comparison with that of the angle of rotation of the plates in the situation where the object is at infinity.

Under the conditions of FIG. 3c, the point of intersection of the support-plane of the plates with the axis of symmetry $x'x$ moves into the position $K_0$Min, such that:

$$K_0 K_o \text{Max} = -K_0 K_0 \text{Min}$$

The movement of the point $K_0$ along the axis $x'x$, which makes it possible to obtain the angle $\alpha$ of rotation of the plates which is appropriate for maintaining the transverse offset at the constant value $\Delta Y'_0$, will be marked $\Delta K_0$, for convenience of description.

Using the relationships given earlier and taking into account in these relationships the constant offset $e(n-1)n^{-1}$ due to the thickness of the plates, the value of the defocusing term $\Delta x'$ can be related to the value of the movement $\Delta K_0$ by means of a linear relationship.

This is why, in a particular embodiment of the invention, the device which produces the movement $\Delta x'$ of the objectives is made integral with the device which produces the movement $\Delta K_0$ by means which make the amplitudes of these movements proportional.

Figure 4:
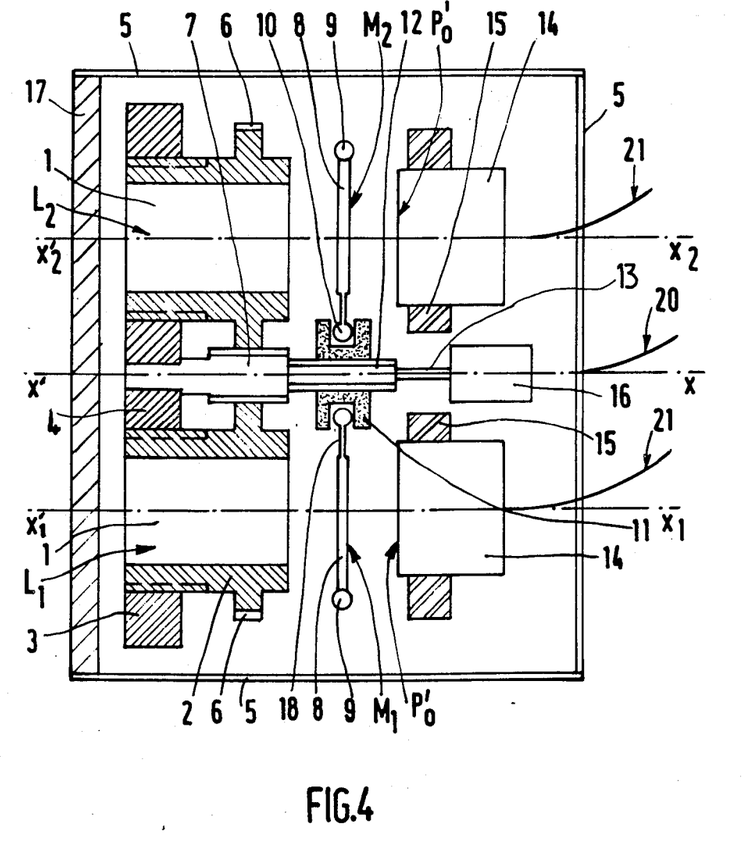

In this embodiment, as shown in FIG. 4, the device according to the invention comprises two identical objectives 1 (which correspond to the objectives $L_1$ and $L_2$ in the preceding figures), which are fixed in a mounting 2, which comprises a part 3 which screws with no clearance into a support 4, and another part 6 which forms a toothed wheel meshing with a pinion 7, which is intended to control the movement of the objectives. The support 4 is integral with the structure 5 which may, for example, be the cover of the device.

The cover 5 may be closed by a parallel-faced plate 17 which is transparent to the radiation employed and which has no optical function in the device according to the invention. The only function of the plate 17 is to protect the device.

The parallel-faced plates $M_1$ and $M_2$, enabling the parallax to be corrected, are indicated by reference 8 in FIG. 4. They can turn around pivots 9 which correspond to the points $K_1$ and $K_2$ of FIGS. 3a–3c. The control of this rotation is ensured by the end 10 of their support 18, placed in the double fork 11. When the fork 11 performs a movement along the axis $x'x$, it drives the end 10 of the support of the plates 8 which then rotate around the pivots 9. The axis 13 to which the fork 11 is connected corresponds to axis $X'X$ through point $K_0$ of FIGS. 3a–3c.

The fork 11 is connected by a screw and nut device 12 to the axis 13 which carries the control pinion 7.

An adjustment of the initial operating point of the device and an adjustment of the amplitude of rotation of the plates 8 must be carried out. Such optical adjustments are customary for a person skilled in the art and are not described here, since, properly speaking, they do not form part of the invention.

The devices indicated by 14 in FIG. 4 may be, for example, image amplifier tubes connected by supply cables 21, or viewing tubes or, yet again, projection tubes. They are integrally fastened to the structure 5 by means of the supports 15.

A driving device 16, which may be a motor powered by means of the connection 20, enables the device to be controlled. This driving device controls simultaneously the rotation of the plates 8 and the translation of the objectives 1, the thread pitch of the focusing rings of the objectives having been determined in relation with the angle of rotation of the plates to make the movement $\Delta x'$ of the objectives, produced by the pinion 7 integrally fastened to the screw and nut device 12 of the fork 11, proportional to the movement $\Delta K_0$ of this pivot.

In the example of embodiment shown in FIG. 4, the following numerical values may be adopted:
focal length of the objectives: $f = f' = 30$ mm;
refractive index of the plate material: $n = 1.516$;
thickness of the parallel-faced plates: $e = 1.93$ mm;
distance between the optical axes: $2H = 60$ mm;
angle of tilt under the conditions in which the object is at infinity: $\alpha \text{Max} = 4°$;
angle of tilt in the position where the object is placed in an intermediate position defined as its distance from the object focal plane $\pi = 20$ m:
$\alpha \text{Min} = 0$. (the support-plane of the plates is then perpendicular to the axis of symmetry of the system);
angle of tilt under the conditions where the object is in the closet position to the objective, defined as the distance: $\pi = 10$ m:
$\alpha \text{Max} = -4°$
distance between the fixed tilting points of the plates and the general axis of symmetry: $h = 70$ mm.

Table 1 gives the value of the deviation $\Delta x'$ for a device of this kind as a function of the other variables of the system and for different values of these variables, which are:
distance from the object to the object focal plane: $\pi$ in m;
magnification: $G$;
transverse deviation of a system devoid of parallel-faced plates: $\Delta Y' = H G$, given in /$\mu$m;
distance between two image points when the system is devoid of parallel-faced plates: $D$, given in mm;
angle of tilt of the plates: $\alpha$, in degrees;
distance between two image points of the system equipped with parallel-faced plates: $D_0$, in mm;
variation in the transverse deviation $\Delta Y'_0$ in the system equipped with parallel-faced plates: $\delta(\Delta Y'_0)$, in nm.

The distance $D_0$ between the image points assumes the value $D_0 \infty = 60.090$ mm for three positions of the object plane, which are:
the position where $\pi = \infty$
the position where $\pi = 20$ m, which corresponds to the object point $C_{int}$;
the position where $\pi = 10$ m, which corresponds to the object point $C_{min}$.

TABLE I

| $\Delta x'$ (mm) | $-\pi$ (m) | $-G$ | $\Delta Y' = HG$ ($\mu$m) | $D$ (mm) | $\alpha$ (.) | $D_o$ (mm) | $\delta(\Delta Y'_0)$ nm |
|---|---|---|---|---|---|---|---|
| 0 | | $3^{-1} \cdot 10^{-4}$ | 0 | 60 | $-4$ | $60.090 = D_0^\infty$ | $-0.0$ |
| 0.003 | 300 | $10^{-4}$ | 3 | 60.006 | $-3.73411$ | 60.089990 | $-0.5$ |
| 0.010 | 90 | $3^{-1} \cdot 10^{-3}$ | 10 | 60.020 | $-3.113108$ | 60.0899926 | $-3.7$ |
| 0.015 | 60 | $5 \cdot 10^{-4}$ | 15 | 60.030 | $-2.669075$ | 60.0899912 | $-4.4$ |
| 0.020 | 45 | $2 \times 3^{-1} \times 10^{-3}$ | 20 | 60.040 | $-2.224721$ | 60.0899908 | $-4.6$ |
| 0.025 | 36 | $25 \times 3^{-1} \times 10^{-4}$ | 25 | 60.050 | $-1.780099$ | 60.0899914 | $-4.3$ |
| 0.030 | 30 | $10^{-3}$ | 30 | 60.060 | $-1.335262$ | 60.0899928 | $-3.6$ |
| 0.040 | 22.5 | $40 \times 3^{-1} \times 10^{-4}$ | 40 | 60.080 | $-0.445199$ | 60.0899974 | $-1.3$ |
| 0.045 | 20 | $1.5 \times 10^{-3}$ | 45 | 60.090 | 0 | $60.090 = D_0^\infty$ | 0.0 |
| 0.050 | 18 | $5 \times 3^{-1} \times 10^{-3}$ | 50 | 60.100 | $+0.445159$ | 60.0900026 | $+1.3$ |
| 0.060 | 15 | $2 \times 10^{-3}$ | 60 | 60.120 | $+1.335262$ | 60.0900072 | $+3.6$ |
| 0.075 | 12 | $2.5 \times 10^{-3}$ | 75 | 60.150 | $+2.669075$ | 60.0900088 | $+4.4$ |
| 0.080 | 11.25 | $8 \times 3^{-1} \times 10^{-3}$ | 80 | 60.160 | $+3.113108$ | 60.0900074 | $+3.7$ |
| 0.090 | 10 | $3 \times 10^{-3}$ | 90 | 60.180 | $+4$ | $60.090 = D_0^\infty$ | 0.0 |

Despite the insertion of the parallel-faced plates according to the invention, there remains a residual variation of the distance $D_0$. To enable the value of this residual variation to be assessed, the last column of Table I gives the residual variation of $\Delta Y'_0$ for one channel, this residual variation being denoted by $\delta(\Delta Y'_0)$. It is calculated from $D_0$ by writing:

$$\delta(\Delta Y'_0) = (D_0 - D_0 \infty)/2$$

Figure 5:
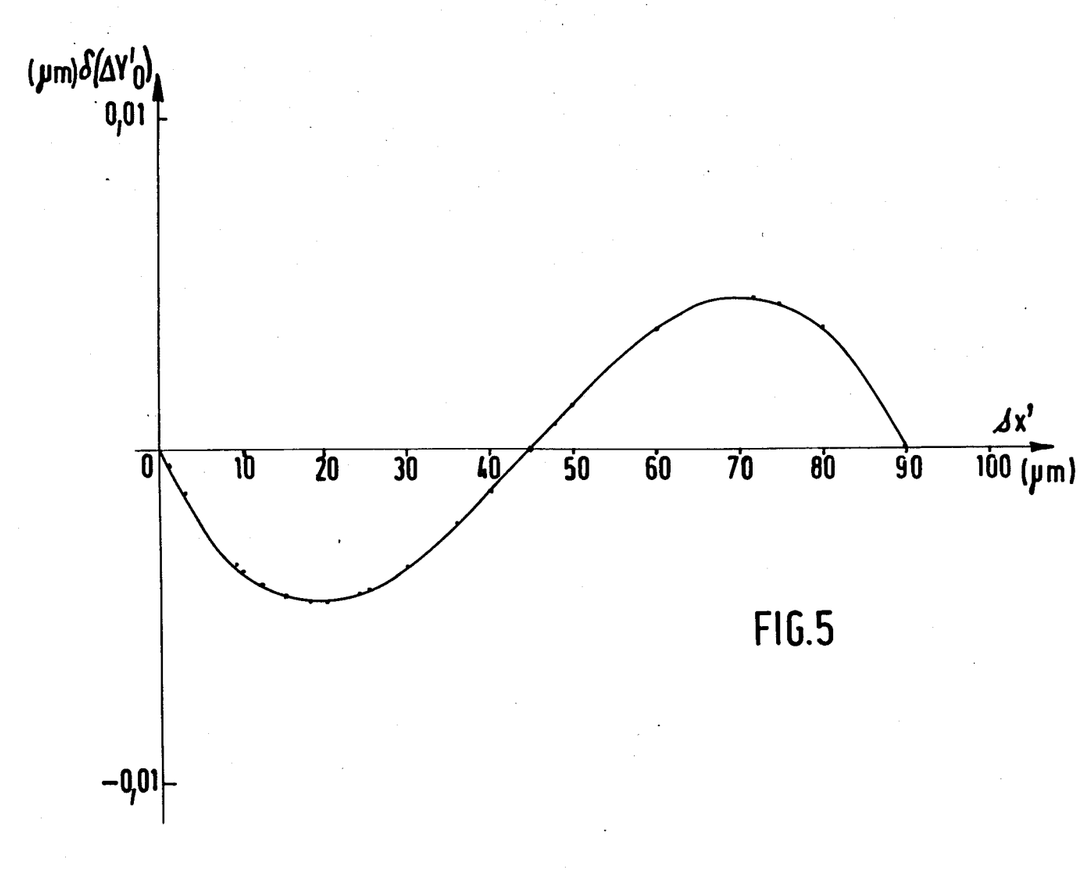
FIG. 5, which shows the curve representing the residual variation of the transverse offset in one path, after correction by means of a device according to the invention conforming to the embodiment described by way of example.

FIG. 5 shows this residual variation $\delta(\Delta Y'_0)$ as a function of the defocusing term $\Delta x'$.

It is found that, in the example of embodiment described, this variation is always less than 5 nm, whereas it goes up to 90 /μm in a device devoid of the plates according to the invention.

The invention is not limited to a device with two objectives, but may also be applied, for example, to a device with three objectives having a general axis of symmetry and parallel optical axes. In such a case the invention is suitable for viewing or for the projection of trichromatic images.

What is claimed is:

1. Optical viewing and projection device, comprising at least two objectives whose optical axes are parallel to a general axis of symmetry of the device, focusing system means for formation of images and viewing in a fixed reference plane, by means of a simultaneous translation of the objectives in parallel to the general axis of symmetry, and means for reducing the parallax produced by the objectives, said means for reducing the parallax including a system of parallel-faced plates which has the general axis of symmetry of the optical device as its axis of symmetry, wherein a parallel-faced plate is placed between each objective and the fixed reference plane, and wherein each plate is inclined to the optical axis of the objective to which it is applied at an angle determined as a function of the thickness and of the refractive index of the material of the plate, and as a function of the focal length and of the distances between objectives, to produce a constant transverse offset of the points in the fixed reference plane which are conjugates of a point of the general axis of symmetry of the device, whatever the position of said point on this axis.

2. Device according to claim 1, wherein said means for reducing the parallax additionally includes system means for permitting correlation of the rotation of the parallel-faced plates with said focusing system means.

3. Device according to claim 2, wherein the inclination of the plates to the optical axis of the objectives is produced by means of the rotation of the plates around a fixed axis perpendicular to a plane defined by the optical axis of the objective and the general axis of symmetry of the system, so that the planes of the plates intersect at a point of the general axis of symmetry, whose movement on this axis is related by a linear relationship to the rotation of the plates.

4. Optical device according to claim 3, wherein said system means for permitting correlation of the rotation of the parallel-faced plates with said focusing system means is a mechanical device producing the translation of the movable point of intersection of the planes of the plates on the general axis of symmetry and producing, in an interdependent manner, a simultaneous and proportional translation of the objectives in parallel to this axis, the amplitude of these translations and their direction being determined to produce both the focusing in the fixed reference plane and the compensation of the parallax error by the appropriate inclination of the parallel-faced plates.

5. Optical device according to claim 4, wherein the translation of the objective, in order to produce the focusing in the fixed reference plane, in the situation of aiming at infinity, is of the same magnitude as, and opposite in direction to, this translation in the situation of aiming at minimum distance, when compared with a situation of intermediate aim in correlation with the position of the movable point of intersection of the planes of the plates on the axis of symmetry, for which these plates are perpendicular to the optical axes of the objectives to which they are applied.

* * * * *